United States Patent [19]

Eidsmo et al.

[11] 4,074,073
[45] Feb. 14, 1978

[54] PILOT RECEIVER MEMORY UNIT IN A CARRIER FREQUENCY SYSTEM

[75] Inventors: Arne Eidsmo, Tyreso; Bengt Gustav Löfmark, Skarholmen, both of Sweden

[73] Assignee: Telefonaktiebolaget L M Ericsson, Stockholm, Sweden

[21] Appl. No.: 668,429

[22] Filed: Mar. 19, 1976

[30] Foreign Application Priority Data

Apr. 4, 1975 Sweden .................................. 7503881

[51] Int. Cl.² .............................................. H04J 1/16
[52] U.S. Cl. ............................ 179/15 BP; 179/15 FD; 325/405
[58] Field of Search ......... 179/15 BP, 15 FD, 15 FS; 333/15, 16; 325/2, 42, 400–401, 405

[56] References Cited

U.S. PATENT DOCUMENTS

| 3,743,786 | 7/1973 | Hiratsuka | 179/15 BP |
| 3,974,447 | 8/1976 | Lofmark | 179/15 BP |
| 4,009,350 | 2/1977 | Cabet | 179/15 BP |

Primary Examiner—Kathleen H. Claffy
Assistant Examiner—Joseph A. Popek
Attorney, Agent, or Firm—Hane, Roberts, Spiecens & Cohen

[57] ABSTRACT

A pilot receiver memory unit is described which is included in a carrier frequency system for storing the control value to the regulating amplifier of each group demodulator in the receiver. The memory unit utilizes a circulating digital shift register having a number of sections equal to the number of space-divided groups. The digital contents of each section which determines the control value can be changed in dependence on determination signals which are supplied through logic means to the register. The control value is converted to analog form before being supplied to the group amplifiers.

4 Claims, 5 Drawing Figures

PILOT RECEIVER MEMORY UNIT IN A CARRIER FREQUENCY SYSTEM

The present invention relates to a pilot receiver memory unit in a carrier frequency system for spaced-divided frequency groups.

In carrier frequency transmission, certain frequency bands are used for the transmission of the separate speech bands. Within each of these frequency bands an internationally standardized pilot signal with a determined level is transmitted, i.e. the level of the pilot signal is determined by the nominal level of the carrier frequency system. The level of the received pilot signal forms a measure of the state of the system and the signal is intended to indicate possible deviations from this state. For this reason there is on the receiver side of the system a pilot receiver which recovers the pilot signal, amplifies and rectifies the same. The signal thus obtained is applied as a control signal to a regulating amplifier which is connected to the receiving path.

The different speech bands are brought together in so-called basic groups, for example, 60 speech bands being brought together to a so-called basic 60-group and a number of such groups, for example, 16 are transferred within the frequency band 60-4028 kHz. At the receiver side, the transmitted 60-groups are divided into 16 different space-divided channels, the reference pilot signal common for each group being recovered in a group demodulator.

It is previously known, see for example "Ericsson Review", No. 3, 1966 pages 126-130, to provide one pilot receiver for all 60-groups. This implies that in each space divided 60-group in the receiver side, a regulating amplifier together with a group demodulator is arranged and each of the group demodulators is controlled from a common pilot receiver which is successively connected to the demodulators one at a time. The common pilot receiver senses in consecutive order the level of the reference pilot signals of the groups. Then it is necessary to provide for a memory function so that the control of a scanned group can be maintained at least during the scanning time of the remaining groups. This time can, due to the number of groups, vary from about 10 seconds up to some minutes.

The pilot receiver shown in the above mentioned article is connected to a level adjusted for each group. Each level adjuster contains a memory element which, in dependence on the level difference of the pilot signal coming to the pilot receiver, stores the control signal belonging to the group. The memory element thus stores the control magnitude of the scanning of remaining groups and during the time which is required in order that the correct amplification in the group modulation equipment should be adjusted. The memory unit includes a reversible binary counter which consists of a number of bistable flip-flops together with associated drive stages.

An object of the present invention is to provide a memory element for a pilot receiver in a carrier frequency equipment of the above mentioned kind, which is less complex than previously known memory elements so that information from the successive scanning of one or a number of carrier frequency groups can be stored in one and the same monolitic circuit.

It is preferable to design the memory element so that it can be utilized for several groups, whereby savings in components included in the memory element and belonging drive stages can be attained.

The invention the characteristics of which appear from the appended claims, will be explained more in detail with reference to the accompanying drawings in which:

Figure 1:
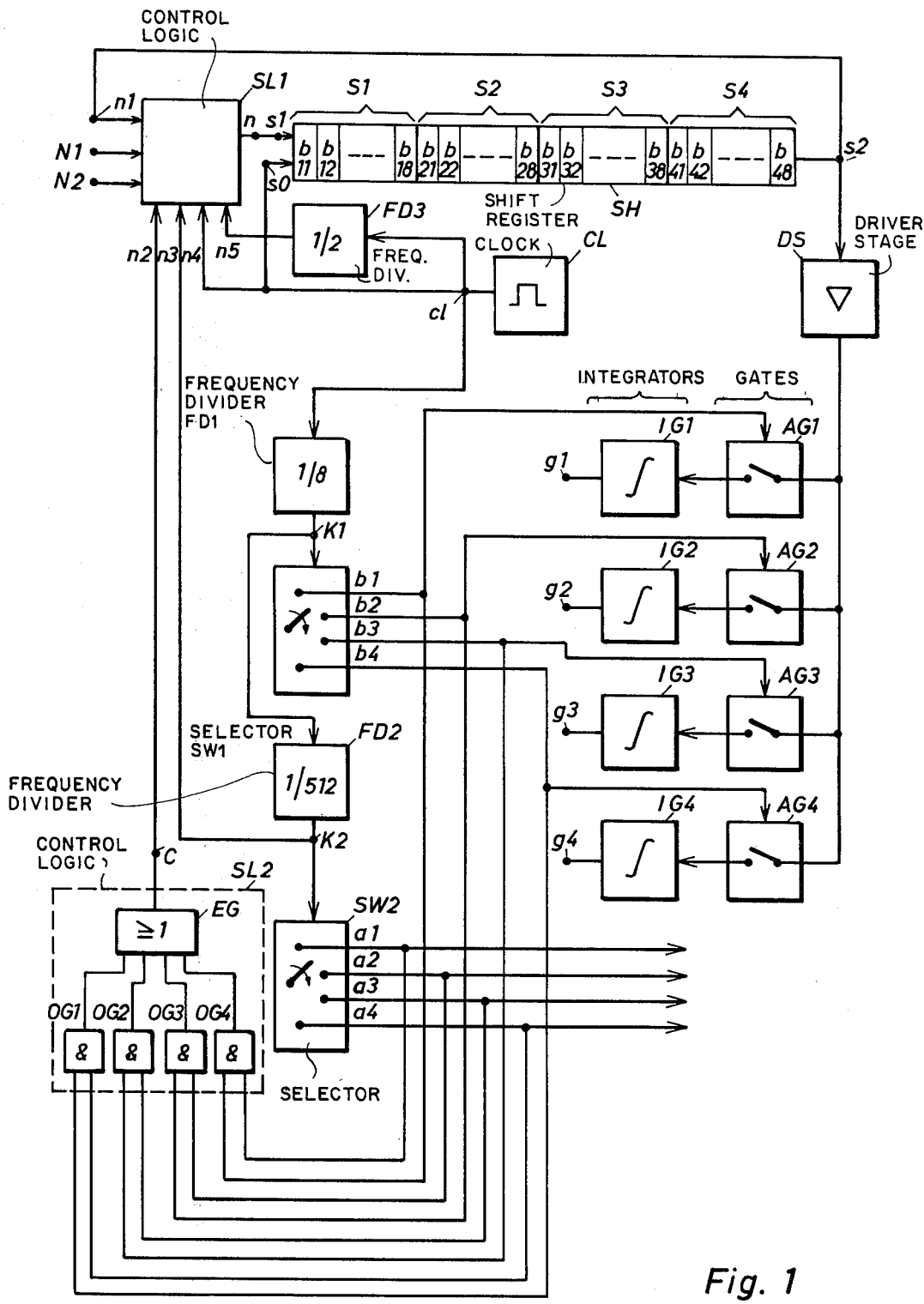
FIG. 1 shows a memory unit according to the present invention together with belonging feed out units to the different space-divided groups.

FIG. 1 is a block diagram showing an embodiment of the memory unit according to the invention and feed out units for connection of the memory unit to the group demodulators in the different space-divided carrier frequency groups. The memory unit consists of a circulating digital shift register SH, the binary positions of which are adapted to be circulated by means of a control logic SL1. The different positions in the register SH are assumed to be divided into a number of sections having a certain number of positions in each section, the number of sections being equal to the number of space-divided groups subject to scanning. Each section preferably contains an equal number of binary positions. It is also possible, as will be described below, to utilize a circulating shift register for each group.

In order to simplify the description of the memory unit function together with associated input and output circuits, it is assumed that the number of groups, i.e. the number of sections in the register SH is equal to four and that each section S1-S4 contains eight positions, designated $b11-b18$ for section S1, $b21-b28$ for section S2. Thus, the shift register SH in all contains $4 \times 8 = 32$ different positions. The positions of register SH can be stepped forward by clock pulses received at its clock input from the output cl of the clock circuit CL. To the input S1 of the shift register the output n of the control logic SL1 is connected, the logic of which will be more fully described in FIG. 5. The binary contents in each section of the register SH forms a measure of the control magnitude to the regulating amplifiers of the different groups in the receiver path. This contents is brought to circulate the time with the clock pulses and, by means of the control logic SL1, the register contents is changed or maintained in such a manner that, for example, a binary "one" fed out from the output $s2$ and supplied to the input $n1$ of the control logic again is supplied to the register SH via its input $s1$ as a binary "zero" or "one." The condition for the information fed out from the shift register to be changed or not is determined by the level across the inputs N1 and N2 of the control logic SL1. These inputs are connected to the determining circuit of the pilot receiver as is described in the article mentioned in the introduction. In the determining circut the level of the pilot signal of the receiver is determined in known manner and for the pilot receiver the following representation is used:

| N1 | N2 | Signification | Change in the register SH |
|----|----|---------------|---------------------------|
| 0 | 0 | Pilot level = nom | No |
| 1 | 0 | Pilot level < nom | Binary "one" transferred to "zero" |
| 0 | 1 | Pilot level > nom | Binary "zero" transferred to "one" |
| 1 | 1 | Alarm | Set into mean state |

The above table thus indicates what measures concerning the shift register contents should be taken in dependence on the state across the inputs N1 and N2 which indicate the pilot signal level relative to a prescribed nominal level of the system.

To the output of the register SH a driving stage DS is connected in order to supply a current in dependence on the binary information fed out from the register to an analog gate AG1-AG4 for each group. To the outputs of the analog gates, integrating circuits IG1-IG4 are connected. If a binary "one" is fed out from the register SH, a current from the driving stage DS is obtained and, depending on which one of the gates AG1-AG4 is conducting, a current is delivered to the subsequent integrating circuit. Each of the gates AG1-AG4 conducts a current in dependence on control pulses from the outputs $b1$-$b4$ of a first selector device SW1. The driving stage can consist of a controlled current generator. When a binary "one" is fed out from the register, a current is delivered to the gates AG1-AG4, whereas a fed out binary "zero" implies that no current is delivered to the gates. For each binary "one", a current peak is obtained through the analog gate and the integrating circuit which consists of a capacitor then is charged to a certain amount.

In dependence on the number of binary "ones" being fed out, the output voltage across the outputs $g1$-$g4$ will assume a certain value which determines the control magnitude.

Figure 2:
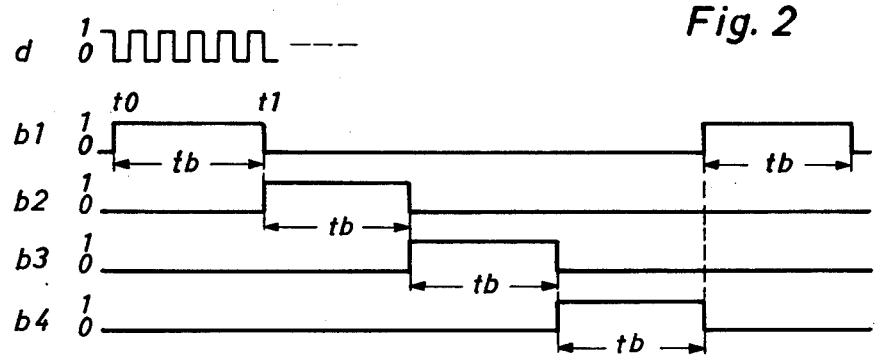
FIG. 2 is a timing diagram showing the opening pulses to the feed out units according to FIG. 1.

The selector device SW1 is, via its control input, connected to the output of a frequency divider FD1 which, in the embodiment shown, divides the clock frequency by a factor 8, so that in consecutive order across the outputs $b1$-$b4$ a pulse with high level is obtained during a time interval corresponding to eight clock pulses, i.e. the time for feeding out one of the sections S1-S4 of the shift register SH. Thus, acrross the outputs $g1$-$g4$, an analog value is delivered which determines the control magnitude to the regulating amplifier of the respective group as described in the article in "Ericsson Review" mentioned in the introduction. The timing diagram according to FIG. 2 shows the characteristics of the clock pulses from the clock circuit CL together with the time position and the time interval of the pulses fed out from the output $b1$-$b4$.

Figure 3:
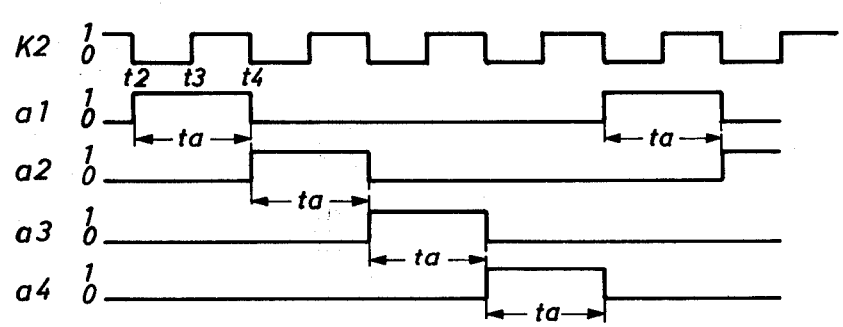
FIG. 3 is a timing diagram showing the opening pulses to static relays included in the receiver path of the different frequency groups.

By SW2 a second selector device is designated which, via its control input, is connected to the output of a frequency divider FD2. This divides the frequency of the pulses from the output K1 by, for example, a factor 1/512, whereby a sequence of pulses having high level appears across the outputs $a1$-$a4$ during a time interval corresponding to the time for scanning one group of the space-divided groups. The timing diagram according to FIG. 3 shows on the one hand the pulses obtained from the output K2 of the frequency divider FD2 and on the other hand the pulses which are successively fed out from the outputs $a1$-$a4$. As appears from the above-mentioned article, each group is scanned during a time interval 2.5 s, for which reason the time length ta of one pulse should correspond to this time interval. The outputs $a1$-$a4$ are connected to the static relays in each group demodulator in the receiving path in order to open a path for the associated group pilot from the group demodulator to the common pilot receiver.

A second control logic block is designated SL2 which contains a number of AND-gates OG1-OG4 corresponding to the number of sections in the shift register SH. One input of each of the AND-gates is connected to the outputs $b1$-$b4$ of the selector device SW1 and the other input of each of the AND-gates OG1-OG4 is connected to the outputs $a1$-$a4$ of the selector device SW2. The outputs of the AND-gates OG1-OG4 are connected to the inputs of an OR-circuit EG the output of which forms the output C of the control logic block SL2. This output is connected to the input $n2$ of the control logic block SL1 and is activated when two inputs of an AND-gate are high. This means that the output C is activated only when the contents of the shift register SH is fed out and, at the same time, scanning of the associated group takes place, c. f. the timing diagrams according to FIGS. 2 and 3. The clock pulses from the clock circuit CL are fed via the input $n4$ of the control logic block SL1 and, via the inputs $n3$ and $n5$, divided clock pulses are fed to the block SL1, as it will be explained further below.

Figure 4:
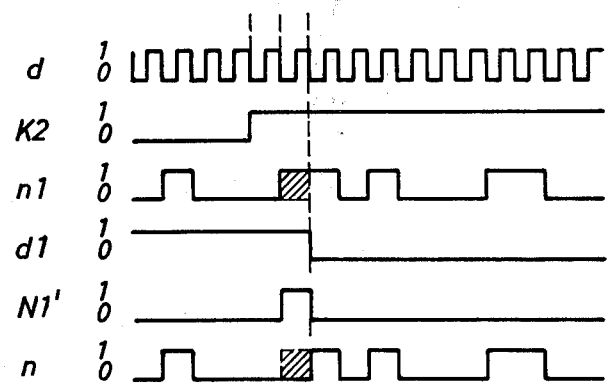
FIG. 4 shows a timing diagram in order to explain the functions of the memory unit according to the invention.
Figure 5:
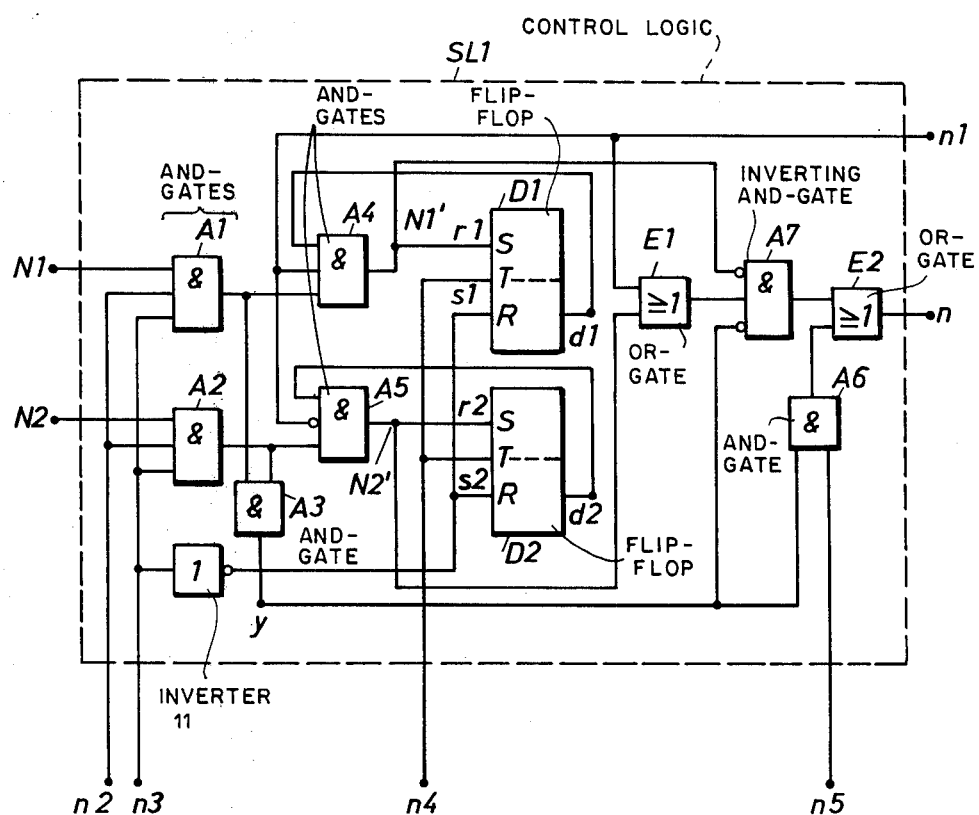
FIG. 5 shows a circuit diagram of a control logic included in the memory unit according to the invention.

The control logic block SL1 will be more closely described with reference to FIG. 5 and in connection with the timing diagrams according to FIGS. 2 - 4. The designations of the inputs of the block are the same as in FIG. 1. The inputs N1 and N2 across which binary representations about the level of the pilot signal is obtained, are together with the inputs $n2$ and $n3$ connected to two AND-gates A1 and A2. The outputs of these gates are connected to each of the inputs of the two AND-gates A4 and A5. A second input of these gates is connected to the input $n1$ across which the binary information fed out from the shift register SH appears.

The input $n2$ is "one"-set when the output C of the control logic SL2 is activated, i.e. when simultaneous scanning and feeding out of a determined group takes place. This appears from the timing diagram according to FIG. 2 which shows that, during the time interval $tb$ when feeding out of a certain shift register section SH takes place, the corresponding output of the selector device SW1 is "one"-set. If, for example, the output $b1$ is "one"-set, feeding out from the section S1 of the register takes place and the output of the selector device SW2 is "one"-set. During the second half of each scanning, i.e. during the time interval $t2$-$t3$, the output K2 is also "one"-set. This implies that the inputs $n2$ and $n3$ both are "one"-set during the later half of each scanning period of a certain group and when simultaneous feeding out of the corresponding shift register section takes place. The gates A1 and A2 then are not blocked.

When $n2 = 0$, i.e. scanning of a group takes place which does not belong to corresponding shift register section for feeding out, or when $n3 = 0$, i.e. when the pilot receiver is not stabilized, both the gates A1 and A2 are blocked. Then also the gates A4 and A5 are blocked, the outputs N1' and N2' being equal zero.

To the outputs of the gates A1 and A2, an AND-gate A3 is connected the output of which is connected on the one hand to one inverting input of an inverting AND-gate A7 and on the other hand to one input of an AND-gate A6. When the gates A1 and A2 are blocked, then $y$ = 0 which implies that the gate A6 is blocked and the gate A7 is open (conducting).

An OR-gate E1 is with its two inputs connected to the output N2' of the gate A5 and to the input n1. The output of the gate E1 is connected to the non-inverting input of the AND-gate A7, the other inverting input of which is connected to the output N1' of the gate A4. To the output of the gate A7, an OR-gate E2 is connected the output of which forms the output n of the logic block SL1.

$y = 0$ and, in addition, $N1' = N2' = 0$ according to the above, the binary information across the input n1 passes unchanged through the gates E1, A7 and E2, i.e. the output signal from the shift register SH appears unchanged across its input s1.

The outputs of the two AND-gates A4 and A5 are connected to one input r1, r2 respectively to each of two RST flip-flops D1, D2, the two outputs of which have been designated d1, d2 respectively. The clock input of the two flip-flops is connected to the input n4 across which clock pulses from the clock circuit CL appear. When the r-inputs of the flip-flops are "one"-set, the corresponding output d1, d2 respectively will be "zero" upon "one"-level of the incoming clock pulse. If, instead, the s-inputs are "one"-set a "one" is obtained across the outputs d1 and d2 upon the "one"-level of the incoming clock pulse. Each s-input of the flip-flops D1 and D2 is, via the inverting gate I1, connected to the input n3. From the timing diagram according to FIG. 3 it is apparent that this input assumes a low level during the first half $t0$–$t2$ of each scanning period ta. Both the s-inputs, thus, are "one"-set and $d1 = d2 = 1$ which represents the quiescent state. When the input n3 is "one"-set at the time t2 according to FIG. 3, then $s1 = s2 = 0$ at the same time as the gates A1 and A2 no longer are blocked by the condition $n3 = 0$. The flip-flops D1 and D2 then can be "zero"-set if N1' and N2' is equal 1.

If $N1 = N2 = 0$, the two gates A4 and A5 are blocked. This gives the same result as when $n2 = 0$ which has been dealt with above.

It is now assumed that $N1 = 1$, $N2 = 0$ and that the level across the output K2 is changed from a low to a high level. The timing diagram according to FIG. 4 illustrates the operation of the control logic SL1. The flip-flops are in their quiescent state and $d1 = d2 = 1$. Furthermore, $K2 = 1$, so that the gate A4 is conducting and gate A5 is blocked, since $N1 = 1$ and $N2 = 0$. At the time t4, according to FIG. 4, $n1 = 0$ implying that $N1' = 0$. Thus, also the output $n = 0$ and the information fed in is unchanged. When n1 becomes equal to 1 at the time t5, and also $N1' = 1$ which, however, implies that the gate A7 becomes blocked and the "one" appearing across the input n1 is changed to a "zero". At the first decreasing flank of the clock pulse, the flip-flop D1 changes it state so that $d1 = 0$ at the time t6. Thus the gate A4 is blocked, whereby $N1 = 0$. This implies, however, that the gate A7 again becomes conducting and the binary shift register information can pass the OR-gate E1 ($N2' = 0$), so that, afterwards, the register information can pass the control logic SL1 unchanged. Thus, a binary "one" from the output of the shift register SH has been changed to a binary "zero" at the feed in process which in FIG. 4 has been indicated by the shaded pulse. In a corresponding manner, a binary "zero" fed out from the output of the shift register is changed to a "one" when $N1 = 0$, $N2 = 1$. When the output K2, after the scanning, again assumes "zero" level at the time t3 according to FIG. 3, the output of the gate I1 will become "one"-set and the flip-flops D1 and D2 again are in their quiescent state, i.e. $d1 = d2 = 1$.

The flip-flops D1 and D2, thus, are reset to their quiescent state after scanning of a group and they change their state only during a clock pulse period in dependence on the value across the inputs N1 and N2. Thus, only one bit position in a certain section can be changed when scanning an associated group. If this is not sufficient, the condition $N1 = N2 = 0$ remains unchanged when the same group again is scanned and the first appearing binary "one" across the input n1 is transferred to a "zero" when fed into the shift register SH. If both N1 and $N2 = 1$ and, at the same time $n2 = n3 = 1$, output y will be equal to 1 and the gate A7 is blocked. The gate then become conducting and, via the gate E2, pulses having half the clock frequency are fed to the control logic SL1 through the input n5. Every second position of the shift register section will then be "one"-set and every second position will be "zero"-set, i.e. the section is adjusted to its mean state which is desired at the alarm state for the group corresponding to the actual shift register section.

The embodiment shown in FIG. 1 stores the control magnitude in the form of binary positions which are sectionally brought together in one and only one shift register SH. The different sections, thus, can be regarded as time shared. It is, however, also possible to share the shift register sections in space, each section being represented by a circulating shift register and an equal number of such registers as the number of groups can be arranged in the memory unit.

We claim:

1. In the receiver section of a carrier frequency system utilizing pilot signals for space-divided frequency groups having a receiver with receiver paths for each of the groups, a regulating unit in each of the receiver paths, and a memory unit, the receiver delivering determination signals for each of said groups to the memory unit in dependence on the value of the pilot signal associated with the group, the determination signals indicating the level of the pilot signal of the group in relation to a nominal level in order to determine a value to be stored in the memory unit, and the value being supplied as a control value to the regulating unit in the receiver path of the group, the improvement comprising:

a multi-section digital shift register with a section being provided for each of the space-divided group, the binary value stored in each section representing a control value for a specific group, first control logic means for either changing at least one binary value to its complementary value or maintaining the binary value unchanged in dependence on the determination signals upon receipt of an activating signal, clock means for circulating the contents of the shift register sections via said first control logic means for effecting the change or no change of the binary value in a shift register section, controllable converter means provided for each of the space-divided groups in order to transmit the contents of each of said shift register sections in analog form to the regulating units of the groups, first timing means controlled by said clock means for controlling said controllable converter means to a conducting state in synchronism with the emission of the contents of the corresponding shift register section, second timing means controlled by said clock means for delivering control pulses to the receiving path of each space-divided group in order to feed the associated group pilot signal to the receiver, and second control logic means for transmitting an activating signal to said first control logic means during the emission of the binary contents of a certain shift register section simultaneously with the control pulse from said second timing means which belongs to the frequency group associated with said certain shift register section.

2. A memory unit according to claim 1, wherein the number of said shift register sections form the contents in a shift register common to a corresponding number of space-divided groups, each section containing a predetermined and preferably equal number of binary positions, said controllable converter means being commonly connected to the output of said shift register, for converting the binary contents of a section to the corresponding analog value.

3. A memory unit according to claim 2, wherein said first timing means consists of a first selector device which is connected to said controllable converter means for delivering control pulses, each of said control pulses appearing consecutively and during a time interval which corresponds to the time for emitting the contents of one of said shift register sections, and wherein said second timing means consist of second selector device which delivers control pulses to the regulator unit in each of the space-divider groups in order to scan the respective group.

4. A memory unit according to claim 3, wherein said second control logic means has a number of inputs which are connected to the outputs of said first and second selector devices and the output of which is connected to said first control logic means in order to activate said first control logic means when there is a simultaneous scan of a determined group and the emission of the contents of the associated shift register section.

* * * * *